June 14, 1966      P. D. ABBOTT      3,255,828
THREE-POINT HITCH LINKAGE EQUALIZER
Filed Jan. 25, 1963      2 Sheets-Sheet 1
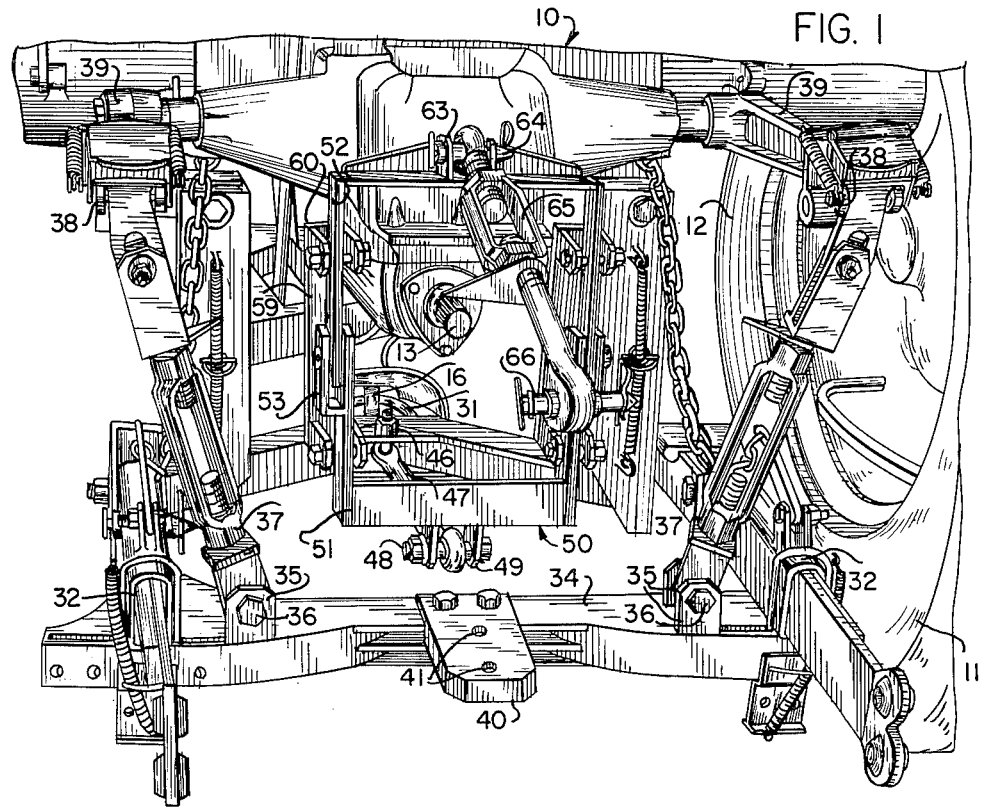
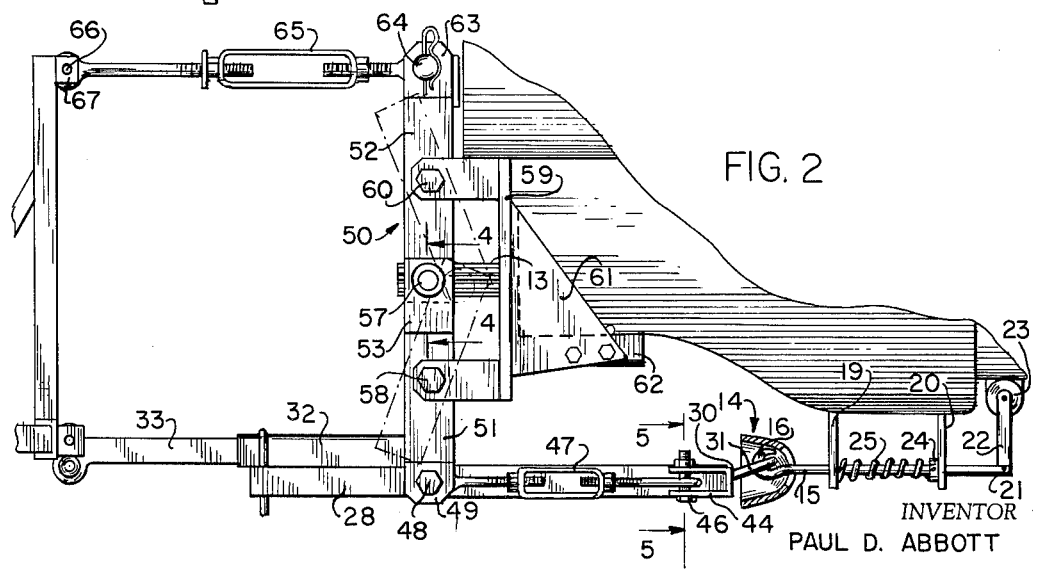
INVENTOR
PAUL D. ABBOTT
BY
ATTORNEYS June 14, 1966  P. D. ABBOTT  3,255,828
THREE-POINT HITCH LINKAGE EQUALIZER
Filed Jan. 25, 1963  2 Sheets-Sheet 2
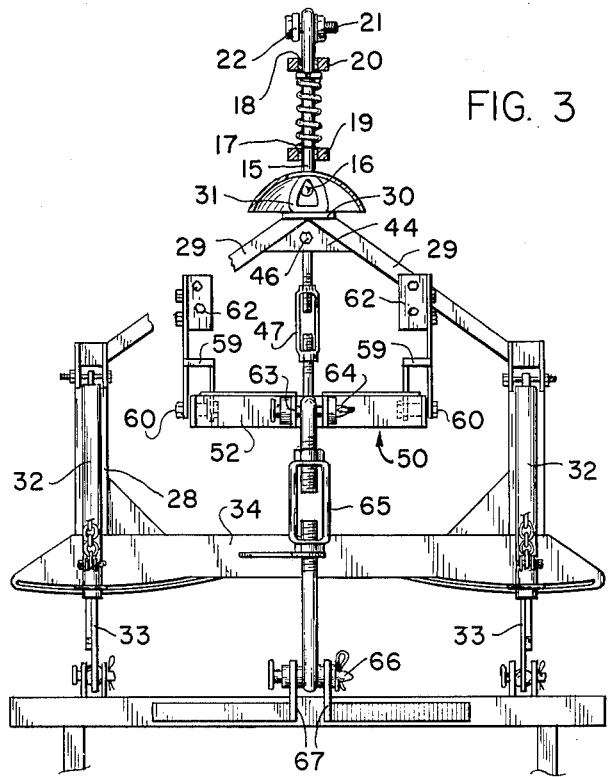
FIG. 3
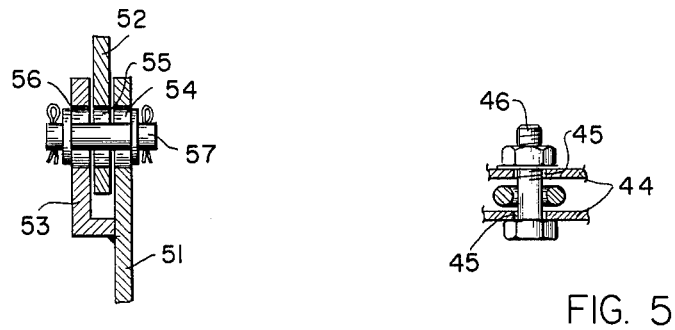
FIG. 4
FIG. 5
INVENTOR
PAUL D. ABBOTT
BY
ATTORNEYS United States Patent Office 3,255,828
Patented June 14, 1966

3,255,828
THREE-POINT HITCH LINKAGE EQUALIZER
Paul D. Abbott, P.O. Box 92, Blytheville, Ark.
Filed Jan. 25, 1963, Ser. No. 254,022
2 Claims. (Cl. 172—7)

This invention relates to cultivation of the soil and to apparatus and equipment by which the various cultivating operations may be readily performed in the simplest and most practical manner by epuipment already available and in use.

The invention relates particularly to a three-point hitch equalizer linkage for use with a tractor having a hydraulic coupling unit associated with the draft of the implement relative to the tractor thereby enlarging the usefulness of the tractor.

Heretofore tractors of this type have depended on various types of connections for pulling various types of implements. The tractors which exert force through a hydraulic connection or coupling have had to depend upon a single-point connection since more than a single point would tend to cause the implement to penetrate the earth deeper than desired and at a longitudinal angle when tension was increased on the implement. This structure has eliminated the conventional three-point hitch with which most equipment is provided and therefore tractors of this type have been restricted to use with implements specifically constructed for utilization by such tractors.

It is an object of the invention to provide a three-point hitch linkage equalizer which will permit any implement having one, two or three-point connections to be easily and simply attached to a tractor having a hydraulically connected draw bar.

Another object of the invention is to provide a three-point hitch linkage equalizer for use on a tractor having a hydraulically connected draw bar in which the linkage equalizer will exert balancing forces on all of the connecting points between the implement and the tractor regardless of the longitudinal movement of the draw bar.

A further object of the invention is to provide a device which can be connected to a tractor having a hydraulic draw bar connection and utilized for controlling the depth of penetration of an implement.

A still further object of the invention is to provide a device which will regulate the amount of penetration of an implement and which will control the amount of pressure applied to the driving wheels of a tractor having a hydraulically connected draw bar.

Other objects and advantages of the invention will be apparent from the following description taken in conjunction with the accompanying drawings wherein:

FIG. 1 is a perspective illustrating one application of the invention;
FIG. 2, a side elevation thereof;
FIG. 3, a top plan view of the structure of FIG. 2;
FIG. 4, an enlarged vertical section on the line 4—4 of FIG. 2; and
FIG. 5, an enlarged vertical section on the line 5—5 of FIG. 2.

Briefly stated the present invention is a three-point hitch linkage equalizer for application to a tractor or other vehicle having a draw bar attached to such vehicle through a hydraulic spring loaded connection. The equalizer comprises a main frame to which two of the implement connecting points are attached and such main frame is connected to the hydraulic coupling of the vehicle. A toggle frame is provided having supports connected to the vehicle in such a manner that the lower portion of such toggle frame is controlled by the movement of the main frame and the upper portion of such frame is under the influence of the lower portion. The upper portion of the toggle frame is connected to the third point of the three-point connection so that when the implement and main frame tend to move rearwardly, due to additional strain being placed on the implement, the third point will move rearwardly a distance equal to the distance moved by the main frame to maintain the implement in parallel relation with the earth while sustaining substantially the same amount of penetration and transferring additional pressure to the driving wheels of the vehicle to increase the traction thereof.

With continued reference to the drawings a tractor 10 is provided having driving wheels 11 and axle housings 12 and such tractor may have a power takeoff shaft 13 adapted to be connected for driving various implements. The tractor 10 has a snap coupling 14 including a rod 15 having a hook 16 formed on one end. The rod 15 extends forwardly through bearings 17 and 18 mounted in a pair of supporting members or brackets 19 and 20 connected to the vehicle.

The forward end of the rod 15 is connected by a pivot pin 21 to an operating lever 22 which operates a hydraulic valve 23 connected in the hydraulic system of the vehicle for a purpose which will be described later. A collar 24 is adjustably carried by the rod 15 and is movable lengthwise thereof for adjusting the tension on a spring 25 disposed between the collar 24 and the rearmost supporting member 19. If desired the position of the collar 24 may be manually adjusted and controlled in any conventional manner by the operator of the vehicle to regulate the amount of pressure required to operate the hydraulic valve 23.

A universal tractor hitch of a construction similar to that disclosed in Patent 3,031,208 is provided having a main frame 28 with a V-shaped front portion 29 terminating in a plate 30 to which a ring 31 is welded or otherwise attached. Such ring is adapted to engage the hook 16 when the vehicle and frame are in assembled relation. A pair of sleeves 32 are adjustably mounted on opposite sides of the rear portion of the frame 28 and each of such sleeves is adapted to receive a tongue 33 providing connections for two points of the three-point hitch. The rear portion of the frame 28 terminates in a draw bar 34 having a pair of upstanding lugs 35 at each side thereof and such lugs are pivotally connected by pins 36 to one end of adjustable connecting members 37. The opposite ends of the connecting members 37 are connected by pins 38 to the free ends of the hydraulic lift arms 39 of the vehicle. If desired the draw bar 34 may have a mounting plate 40 attached to the central portion thereof and such mounting plate may have one or more openings 41 for the attachment of an implement having a single hitch.

In order to equalize the tension or pressure of the third point and to maintain the third point in substantially the same relation with the first and second points, a pair of vertically spaced support plates 44 are welded or otherwise attached to the V-shaped front portion 29 and the plate 30 of the frame 28 and each of such support plates has an opening 45 for the reception of a connecting bolt or pin 46. One end of an adjustable connecting member 47 is pivotally attached to the pin 46 and the opposite end of such member is pivotally connected by the pin 48 to a pair of lugs 49 depending from the lower portion of a toggle or auxiliary frame 50. The toggle or auxiliary frame 50 includes a lower U-shaped member 51 and an upper U-shaped member 52. The lower U-shaped member 51 has outwardly and upwardly extending brackets 53 welded or otherwise attached adjacent to the free ends thereof and such brackets and free ends of the U-shaped member form grooves for the reception of the free ends of the upper U-shaped member 52. The free ends of the lower U-shaped member 51, the upper U-shaped member 52 and the bracket 53 are provided with elongated slots 54, 55 and 56, respectively, in which a pivot pin 57 is mounted.

In order to support the toggle or auxiliary frame 50, the lower U-shaped member is connected by pivot pins 58 to one end of a C-shaped yoke 59 at each side of the toggle frame and the upper U-shaped frame is connected by pivot pins 60 to the upper arms of such yokes. The spacing between the central pivot pins 57 and the pivot pins 58 of the lower U-shaped member is substantially equal to the spacing between the central pivot pins 57 and the pivot pins 60 of the upper U-shaped member. A brace 61 is welded or otherwise attached to the central portion of each of the yokes 59 and extends forwardly thereof to a position whereby it is connected to the vehicle by brackets and fasteners 62. The central portion of the upper U-shaped member 52 is provided with a pair of upstanding lugs 63 connected by a pivot pin 64 to one end of an adjustable connecting member 65 the opposite end of which is connected by pivot pin 66 to the upper connection 67 of the three-point hitch of the implement. Preferably, the upper connection 67 is substantially in the same vertical plane as the first and second-point connections.

In the operation of the device, an earth-working implement is connected to the tongues 33 and to the adjustable connecting member 65 and when the vehicle pulls the implement through the earth such implement will penetrate the earth to the required depth and due to the three-point connection such implement will remain substantially parallel with the surface of the earth at all times. When the vehicle is traversing a field the implement will encounter portions of earth which are harder than other portions and when the implement encounters one of these harder portions the strain will be increased on the implement and the wheels of the vehicle will tend to spin and lose traction. The increased strain on the implement will tend to cause the vehicle to move away from the implement and since the frame 28 is positively connected to the vehicle only at the connection between the ring 31 and the hook 16 such strain will be transmitted to the rod 15 and such rod will be moved rearwardly against the tension of the spring 25. Movement of the rod 15 will cause the hydraulic valve 23 to be operated which in turn will raise the lift arms 39 slightly and transfer the weight of the implement to the driving wheels 11 of the vehicle and thereby increase the traction on such wheels. When the rod 15 moves rearwardly the main frame 28 on which the first and second connecting points are located will likewise move rearwardly. When the main frame 28 moves rearwardly the connecting member 47 will apply a rearward thrust against the lower U-shaped member 51 of the toggle frame 50 and cause the lower portion of such lower member to pivot rearwardly about the pivot pins 58 and cause the upper portion of such lower U-shaped member with the pivot pin 57 therein to move forwardly. The forward movement of the pivot pin 57 will cause the lower portion of the upper U-shaped member 52 to move forwardly which in turn will cause the upper portion of such upper U-shaped member to pivot about the pins 60 and move rearwardly a distance corresponding to the rearward movement of the lower portion of the lower U-shaped member and thereby maintain the third point connection in substantially the same relation with the first and second point connections. When the implement has passed the portion of earth which was causing the strain thereon, the spring 25 will automatically return the main frame 28 and the toggle frame 50 to their initial positions. It will be apparent that the greater the strain applied to the main frame the greater the pressure applied to the driving wheels.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. An equalizer linkage for multiple hitch connection comprising a vehicle, a spring loaded rod carried by said vehicle and connected to the hydraulic system thereof, a hook on one end of said rod, said equalizer linkage including a main frame, a ring mounted on said main frame for engaging said hook, adjustable means for connecting at least two points of a three-point hitch to said main frame, a pair of C-shaped yokes having upper and lower arms attached to said vehicle, an auxiliary frame including a lower U-shaped member pivotally connected to the lower arms of said C-shaped yokes and an upper inverted U-shaped member pivotally connected to the upper arms of said C-shaped yokes, said lower U-shaped member and said upper U-shaped member being substantially the same length and pivotally and slidably connected to each other, means for connecting said main frame to said lower U-shaped member, and means for connecting the third point of a three-point hitch to said upper U-shaped member whereby all three points of the hitch will be maintained substantially in vertical alignment.

2. An equalizer linkage for a multiple hitch connection carried by a vehicle comprising a spring loaded rod adapted to be carried by said vehicle and connected to the hydraulic system thereof, said equalizer linkage including a main frame, one of said rod and main frame having a hook and the other having a ring engageable therewith, adjustable means for connecting at least two points of a three-point hitch to said main frame, a pair of yokes having upper and lower arms attached to the vehicle, an auxiliary frame including a lower member pivotally connected to the lower arms of said yokes and an upper member pivotally connected to the upper arms of said yokes, said lower member and said upper member being substantially the same length and pivotally and slidably connected to each other, means for connecting said main frame to said lower member, and means for connecting the third point of a three-point hitch to said upper member, whereby all three points of the hitch will be maintained substantially in vertical alignment.

References Cited by the Examiner
UNITED STATES PATENTS

| | | | |
|---|---|---|---|
| 2,688,908 | 9/1954 | Reaves | 172—272 X |
| 2,844,083 | 7/1958 | Du Shane | 172—239 |
| 2,971,589 | 2/1961 | Du Shane | 280—446 X |
| 3,128,830 | 4/1964 | Doering | 172—7 |
| 3,162,247 | 12/1964 | Miller | 172—7 |

LEO FRIAGLIA, *Primary Examiner.*

A. HARRY LEVY, BENJAMIN HERSH, *Examiners.*

R. C. PODWIL, *Assistant Examiner.*